March 24, 1953  C. L. DENAULT  2,632,317
FLEXIBLE COUPLING
Filed Aug. 21, 1947  2 SHEETS—SHEET 1
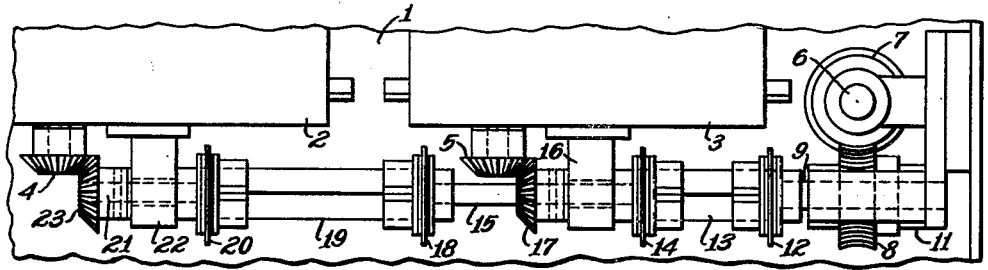
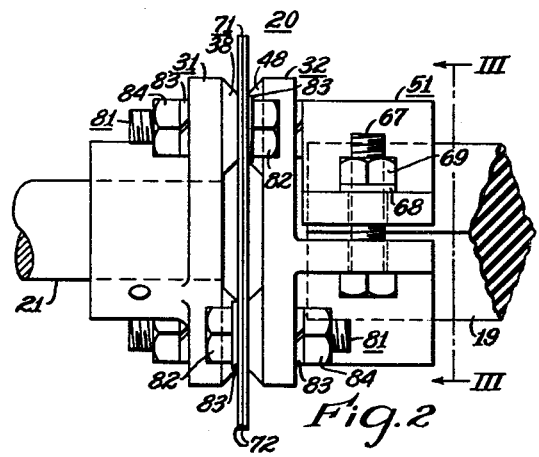
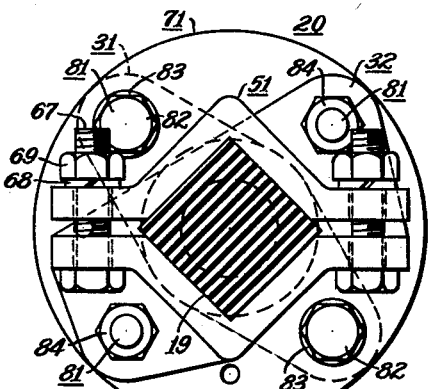
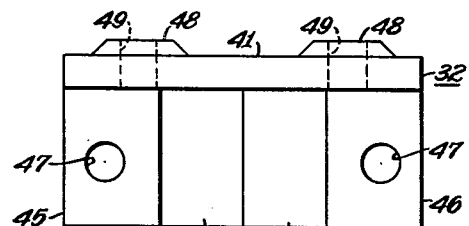
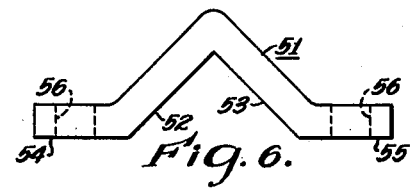
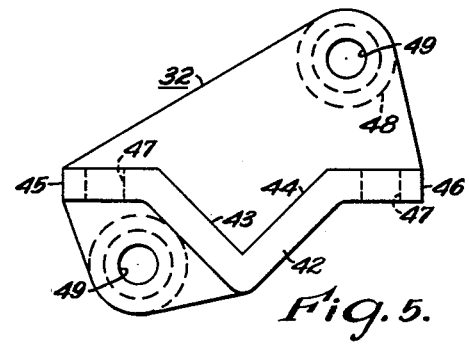
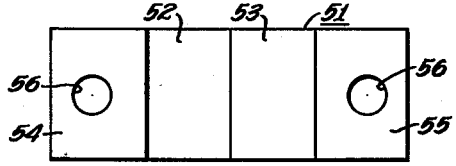
INVENTOR
Clinton L. Denault.
BY
Franklin E. Hardy
ATTORNEY March 24, 1953     C. L. DENAULT     2,632,317
FLEXIBLE COUPLING Filed Aug. 21, 1947     2 SHEETS—SHEET 2

WITNESSES:
Robert C. Baird
Nw. C. Groove

INVENTOR
Clinton L. Denault.
BY
Franklin E. Hardy
ATTORNEY

Patented Mar. 24, 1953

2,632,317

UNITED STATES PATENT OFFICE 2,632,317

FLEXIBLE COUPLING

Clinton L. Denault, Sharpsville, Pa., assignor to Westinghouse Electric Corporation, East Pittsburgh, Pa., a corporation of Pennsylvania Application August 21, 1947, Serial No. 769,901

2 Claims. (Cl. 64—13)

My invention relates to an assembly for transmitting power by rotary motion between shafts by the use of one or more flexible couplings.

One object of the invention is to provide a connection between a driving shaft and a driven shaft which will permit variations in the alignment of the shafts.

Another object of the invention is the provision of a power transmitting assembly of the above-indicated character in which a section of the shaft formed of electrical insulating material is connected between the driving shaft and the driven shaft of the assembly to electrically insulate these two parts of the apparatus from one another.

Other objects and advantages of the invention will be apparent from the following description of a preferred embodiment thereof, reference being had to the accompanying drawing in which:

Figure 1 is an elevational view of a portion of an electrical apparatus embodying the power transmitting assembly of my invention with certain parts shown schematically.

Fig. 2 is a side elevational view of a flexible coupling constructed in accordance with my invention.

Fig. 3 is a view of the flexible coupling taken along the broken line III—III of Fig. 2.

Fig. 4 is a top plan view of the square shaft bracket in the position shown in Figs. 2 and 3 with the other parts of the coupling removed.

Fig. 5 is a front elevational view of the bracket shown in Fig. 4.

Figs. 6 and 7 are front elevational and bottom plan views, respectively, of the square shaft clamp shown in Figs. 2 and 3.

Figure 8:
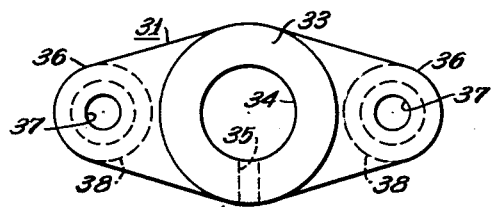
Figs. 8 and 9 are elevational and plan views, respectively, of the round shaft bracket shown in Figs. 2 and 3.

Referring to the drawings, and particularly to Fig. 1 thereof, an apparatus 1, which may be an electrical transformer, is provided with a plurality of separate unit mechanisms 2 and 3, which may be tap changer switch equipments that are operated by independent shafts by means of bevel gears 4 and 5. A source of power is applied to a shaft 6 driving a worm gear 7 that engages a gear 8 that is mechanically attached to the driving shaft 9 supported in a bearing 11 and having a flexible shaft coupling 12 attached to one end thereof. A shaft 13, illustrated as rectangular in cross section and which may be formed of an insulating material, extends between one side of the flexible coupling 12 to one side of a flexible coupling 14 that is carried by the shaft 15, mounted in a bearing 16 on the tap-changing unit 3 and is provided with a bevel gear 17 for engaging the gear 5 for driving the switch mechanism of the unit 3.

The left end of the shaft 15, as shown in Fig. 1, carries a similar flexible shaft coupling 18, the opposite side of which is connected to a square shaft 19 which may be of insulating material, and is connected through the flexible shaft coupling 20 to a shaft 21 carried in a bearing 22 mounted on the tap-changing unit 2 and provided with a bevel gear 23 that meshes with the bevel gear 4 for driving the switch mechanism contained in the tap-changing unit 2. There may, of course, be any number of units driven by the same shaft, such as, for example, the three units of a 3-phase tap-changing mechanism. For simplicity in illustrating the invention, two such units 2 and 3 are shown. The shafts 13 and 19 are illustrated as square in cross section, and as formed of insulating material, and are used as floating shafts, that is, they are not supported directly in bearings but are free to move in accordance with the movements of the flexible shaft couplings attached to their opposite ends. The shafts 9, 15 and 21 are shown as round shafts mounted in bearings and may be formed of steel or other suitable material. The insulating shafts 13 and 19 insulate the mechanisms 2 and 3 from one another and from the metal of the main apparatus 1.

Figure 9:
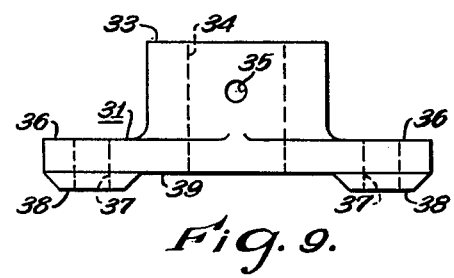

Referring to Figs. 2 and 3, the flexible coupling 20 connected between shafts 21 and 19 is illustrated in greater detail than shown in the schematic representation of the flexible couplings shown in Fig. 1. The flexible coupling includes two bracket members 31 and 32 adapted to be attached, respectively, to the round shaft 21 and to the square shaft 19. The round shaft bracket 31 is best shown in Figs. 8 and 9 and comprises a sleeve portion 33 having a central round bore 34 therethrough for receiving the shaft 21 upon which the bracket is mounted, and a small bore 35 for receiving a pin that may extend into the shaft 21 for securing the bracket to the shaft so that the shaft and bracket will rotate as a unit. Two arms 36 are shown extending from one end of the sleeve 33 in opposite directions from the axis thereof and through which bores 37 are provided for accommodating bolts used for holding parts of the flexible coupling together. Bosses 38 surrounding the bores 37 extend from the face 39 of the bracket and provide bearing surfaces for engaging the flexible disc member of the coupling to be later described.

Figure 10:
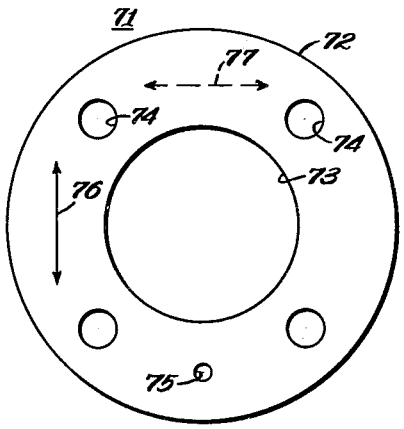
Fig. 10 is an elevational view of the flexible coupling member.

Referring to Figs. 4 and 5, a square shaft bracket 32 is illustrated comprising a plate or face member 41 from which extends a clamping portion 42 containing two inner surfaces 43 and 44 at right angles to each other from which extend the outer flanges 45 and 46 in alignment with each other, and having bores 47 for receiving clamping bolts 67. Bosses 48 extend outwardly from the face 41 of the bracket surrounding bores 49 extending therethrough for accommodating the disk fastening bolts. The square shaft bracket is completed by adding thereto a square shaft clamp 51 shown in Figs. 2, 3, 6 and 7 having two right angle portions providing the clamping surfaces 52 and 53 positioned at right angles to each other, and the surfaces 54 and 55 extending in alignment through which bores 56 extend for receiving clamping bolts 67 shown in Figs. 2 and 3, about one end of which are placed a washer 68 and a nut 69. The bolts 67 extend through the bores 47 in the bracket 32 and through the bores 56 in the clamp 51 to attach the square shaft clamp 51 and the square shaft bracket 32 together with the faces of the clamp 52 and 53 and the faces of the brackets 43 and 44 engaging tightly the four surfaces of the square shaft 19 so as to position the square shaft bracket tightly about the end of the shaft 19 and similarly the square shaft 19. A flexible member 71 is provided comprising one or more flexible discs 72, as shown in Fig. 10, having a central opening 73 and four openings 74 equally spaced about the axis of the disc for accommodating the clamping bolts 81 shown in Figs. 2 and 3. Four clamping bolts 81 are provided extending through four holes 74 in the flexible disc member 71, two of these bolts extending through the bores 49 in the square shaft clamping bracket 32 and two of them extending through the bores 37 in the round shaft bracket 31. The bolts 81 attach the two bracket members tightly to the flexible member 71 with the bosses of one bracket member engaging one side of the flexible member 71 and the bosses of the other bracket member engaging the opposite side. Also, the bosses of one bracket member are spaced intermediate those of the other. For example, the bosses 48 of the square shaft bracket member 32 may engage the flexible member 71 at the upper right and lower left as shown in Fig. 3, while the bosses 38 of the round shaft clamping member 31 may engage the flexible member 71 at the upper left and lower right, as viewed in Fig. 3.

In a flexible shaft assembly constructed in accordance with the invention, two shafts may be operatively connected together which are out of alignment in one of several ways. Frequently, two flexible couplings will be used with an intermediate floating shaft between them, although under some conditions, a single coupling member only may be required, for connecting the driving shaft through a single flexible coupling with the driven shaft without the use of an intermediate shaft. When an intermediate shaft is used, it may be formed of insulating material to thus insulate the driving shaft from the driven shaft together with the mechanisms connected to these two shafts. Most insulating materials such as wood, Micarta or other materials are less rigid than steel or metal parts and are more efficiently attached by a clamping bracket than by means of a pin or key which is adequate for attaching steel shafts to bracket members that are attached to rotate with the shaft.

A coupling construction in accordance with the invention is adapted for easier removal of any of the parts. Removal of the bolts extending through the flexible member 71 allows the shaft ends to slide with respect to each other without the usual dismantling that is required with the use of other couplings, such as universal joints.

The construction illustrated and described allows easy matching of the brackets attached on the ends of the adjoining shafts where the shafts are subject to variation in length. With the brackets clamped to the shafts in a manner described, a considerable variation in shaft lengths is permissible without affecting the clamping power of the bracket over the shaft. For example, when two couplings are employed and a square intermediate shaft is used, the intermediate floating shaft of a chosen standard length will take care of all but extreme variations in shaft lengths. In extreme cases where extreme variations are required, the intermediate shaft can be cut to a suitable length during assembling with far less expense than is usual with other forms of couplings.

It will be noted that the bosses 38 and 48 that engage the flexible disc 71 together with the heads 82 of the bolts 81 and washers 83 that may be placed adjacent the flexible member 71 are of relatively small area so that, when the nut 84 is tightened, strains on the disc 71 will be alike at the clamping surfaces and are small enough to allow free flexing of the member 71 without restraint from the clamping of the brackets thereto. The washers 83 are preferably the same size as the bosses 38 and 48 that engage the flexible member on the side thereof opposite to the washers.

Figure 11:
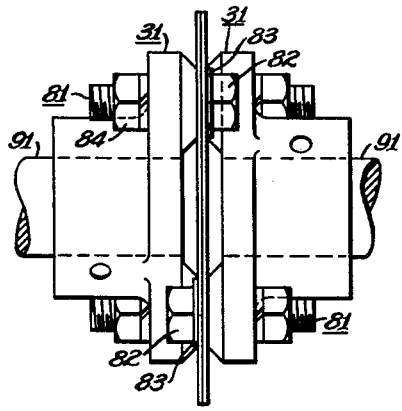
Fig. 11 is an elevational view of a flexible coupling joint assembly organized in accordance with the invention and arranged for connecting two round shafts together.
Figure 12:
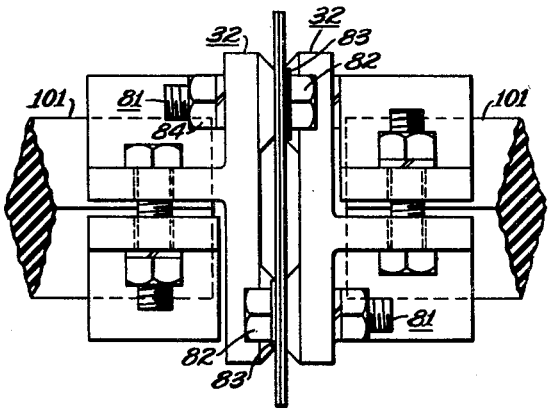
Fig. 12 is an elevational view of a flexible coupling joint assembly organized in accordance with the invention and arranged for connecting two square shafts together.

In the illustrated embodiment of the invention shown in Figs. 2 to 10, inclusive, a round shaft 21 is coupled to a square shaft 19. In Fig. 11, two similar round shafts 91 are coupled together in exactly the same manner as shown in Figs. 2 and 3 with the exception that two round shaft clamping members 31 corresponding to the structure shown in Figs. 8 and 9 are used. In Fig. 12, two rectangular shafts 101 are clamped together by means of two square shaft brackets 32 corresponding to the structures shown in Figs. 4, 5, 6 and 7 as applied to the square shaft 19 in Figs. 2 and 3.

In some material which may be used for the flexible disks, shown in Fig. 10, a pronounced grain is present, as for example, the grain produced in cold rolled brass and Phosphor bronze in the direction of rolling. Since these materials having a pronounced grain have a tendency to fail by cracking when flexed, the failure crack being produced along the direction of rolling, it may be desirable to orient the grain when these materials are used as shown in Fig. 10, lines 76 and 77 showing the directions of the grain in adjacent disks. Such disks are used in pairs, with the direction of the grain for each member of the pair being at right angles to each other. As many pairs of such disks may be used as is required for the torque requirements of the coupling. Holes 75 may be punched in the disks 72 for the purpose of observing whether the disks when assembled have been properly arranged with the grain of the several disks in their desired directions.

When a material is used which does not have a decided preference for direction of failure, such as annealed steel, one or more disks may be used.

It will be apparent to those skilled in the art that modifications may be made in the arrangement of the parts illustrated and described without departing from the spirit of the invention, and I do not wish to be otherwise limited than by the scope of the appended claims.

I claim as my invention:

1. The combination with a round shaft and a square shaft, of means for flexibly coupling said shafts whereby they rotate one with the other, said means including a pair of shaft brackets attached, respectively, to the ends of said two shafts to be coupled, one of said brackets having a round sleeve extending over the end of the round shaft and means for attaching the bracket to the round shaft to rotate therewith, the other of said brackets having a rectangular flange portion for engaging two sides of the end of the square shaft, a shaft clamp having rectangular surfaces for engaging the remaining two sides of the end of the shaft and means for securely attaching the clamp and bracket together, said two brackets having a like number of bosses extending outwardly from adjacent faces thereon and equally spaced about the axis of rotation thereof, a flexible member comprising a plurality of layers of sheets of flexible disk like members secured to the bosses of each shaft bracket, the flexible member having a plurality of holes therein equally spaced about the rim and corresponding in number to the number of bosses on both shaft brackets, the bosses of one shaft bracket being disposed intermediate those of the other and secured to the flexible member by means of bolts extending through the bosses and flexible member, the ends of the bosses having limited areas only in contact with the flexible member, bolts extending from said bosses through the openings in said flexible member washers about the bolts in engagement with the flexible member on the opposite side thereof from the boss, and nuts for clamping the washers, flexible member, and bosses tightly together, the washers having the same contact area and shape in engagement with the flexible member as the bosses so as to maintain like strains on opposite sides of the disk at the clamping surfaces and to allow room for flexing the disk.

2. In an assembly for transmitting power between a square shaft and a round shaft which has electrical insulating characteristics, in combination, a shaft bracket having a sleeve adapted to extend over the end of the round shaft and means for attaching the sleeve provided on the bracket to the round shaft, another bracket having a flange portion which simulates an angle iron for engaging two sides of the end portion of the square shaft, a shaft clamp also simulating an angle iron in shape for engaging the other two sides of the square shaft, and means for attaching the shaft clamp to the flange portion provided on the bracket, a plurality of bosses provided on each of the two brackets, the bosses extending outwardly from the adjacent faces on the brackets and being separated by equal angles around the periphery of the brackets, a flexible member comprising a plurality of layers of sheets of flexible disk-like members secured to the bosses of each shaft bracket, the flexible member having a plurality of holes therein equally spaced about the rim and corresponding in number to the number of bosses on both shaft brackets, the bosses of one shaft bracket being disposed intermediate those of the other and secured to the flexible member by means of bolts extending through the bosses and flexible member, the ends of the bosses having limited areas in contact with the flexible member, bolts extending through said bosses and through the openings in said flexible member, washers on the bolts in engagement with the flexible member on the opposite side thereof from the boss, and nuts for clamping the washers, flexible member and bosses tightly together, the washers having the same contact area and shape in engagement with the flexible member as the bosses so as to maintain like strains on opposite sides of the flexible member at the clamping surfaces and to allow room for flexing the flexible member.

CLINTON L. DENAULT.

REFERENCES CITED

The following references are of record in the file of this patent:

UNITED STATES PATENTS

| Number | Name | Date |
|---|---|---|
| 1,246,445 | Ludeman | Nov. 13, 1917 |
| 1,298,556 | Persson | Mar. 25, 1919 |
| 1,323,046 | Gildner | Nov. 25, 1919 |
| 1,626,195 | Hiller | Apr. 26, 1927 |
| 1,641,294 | Roberts | Sept. 6, 1927 |
| 1,832,285 | Elmer | Nov. 17, 1931 |
| 1,934,228 | Hill | Nov. 7, 1933 |
| 2,182,711 | Thomas | Dec. 5, 1939 |
| 2,331,781 | Hollander | Oct. 12, 1943 |